US006423758B2

(12) United States Patent
Cascino

(10) Patent No.: US 6,423,758 B2
(45) Date of Patent: *Jul. 23, 2002

(54) LOW VOLATILITY CELLULAR FOAM

(75) Inventor: Lawrence A. Cascino, South Bend, IN (US)

(73) Assignee: Gaska Tape, Inc., Elkhart, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/891,018

(22) Filed: Jun. 25, 2001

Related U.S. Application Data

(63) Continuation-in-part of application No. 09/325,098, filed on Jun. 3, 1999, now Pat. No. 6,262,134.

(51) Int. Cl.$^7$ .................................................. C08J 9/16
(52) U.S. Cl. ........................ 521/142; 428/523; 521/56; 521/85; 521/92; 521/93; 521/95; 521/134; 524/183; 524/184; 525/195; 525/196; 525/197
(58) Field of Search ............................ 521/142, 56, 85, 521/92, 93, 95, 134; 428/523; 524/183, 184; 525/195, 196, 197

(56) References Cited

U.S. PATENT DOCUMENTS 5,373,029 A * 12/1994 Naujoks et al. ............. 521/172
5,852,065 A * 12/1998 Frey et al. .................. 521/112
5,880,241 A * 3/1999 Brookhart et al. .......... 428/212

* cited by examiner

Primary Examiner—John M. Cooney, Jr.
(74) Attorney, Agent, or Firm—Ice Miller; Thomas A. Walsh; Doreen J. Gridley

(57) ABSTRACT

A foam composition and method of making the same. The foam of the present invention comprises a mixture of glutarate ester plasticizer, adipate ester plasticizer, alcohol carboxylic acid ester, cell stabilizer, barium/zinc activator stabilizer, potassium/zinc activator stabilizer or zinc stabilizer, azodicarbonamide blowing agent, low-fogging vinyl dispersion resin, vinyl blending resin, and black acrylic pigment dispersion. The foam is made by the process of mixing the ingredients until a homogenous liquid mixture is present, de-airing the homogeneous liquid mixture, casting the liquid mixture on a non-fogging release-coated surface, expanding the cast liquid mixture by exposing it to an elevated temperature for a prescribed duration of time, and then either cooling the expanded mixture and winding it into rolls, or coating the stabilized composition with pressure sensitive adhesive, cooling it, and then winding it into rolls.

20 Claims, No Drawings

LOW VOLATILITY CELLULAR FOAM

This application is a continuation-in-part of U.S. application Ser. No. 09/325,098, filed Jun. 3, 1999 which is now U.S. Pat. No. 6,262,134.

BACKGROUND OF THE INVENTION

1. Field of the Invention

The present invention relates generally to the field of cellular foams and the method of making the same, and, more specifically, to a cellular foam having anti-fogging characteristics.

2. Description of the Prior Art

In the automotive industry, a recognized problem has been the formation of volatile condensate or "fog" on the interior and windshield of the automobile. This residue is unsightly, and may impair the vision of the driver under certain circumstances. One source of the fogging is believed to be the flexible foam gaskets which are in place to seal the interior to exterior passageways of the automobile, such as the door, tail lights, windows, etc. When these gaskets are exposed to thermal cycling during the life of the automobile, the gaskets tend to emit volatile compounds into the interior environment of the vehicle. The volatile compounds eventually condense on the windshield and other surfaces inside the vehicle, forming the "fog." Over time, emission of the volatile compounds also will degrade the gasket to the point where it will no longer perform its intended function properly.

In response to the fogging problem, the Society of Automotive Engineers ("SAE") has developed a standard test to quantify the fogging characteristics of materials used in automotive interiors, which it issued December 1994 and has designated as SAE standard J1756. SAE standard J1756 is well known in the art, and is incorporated herein by reference. Similar standards have been established by Ford Motor Corporation, General Motors Corporation, and other automotive component manufacturers.

At present, the only foam seals known to achieve acceptable results on the SAE J1756 test have been barrier or film coated to effectively block or close the surface of the foam and thereby prohibit or reduce emission of volatiles from the foam. Although such foams satisfy the SAE J1756 test, it is desired to provide a foam which is not barrier or film coated, but which inherently has the same or similar properties and which will achieve acceptable results on these tests. One advantage to such an anti-fogging foam would be in the reduction of manufacturing costs. Foam which must be barrier or film coated is generally more costly to manufacture as additional or more expensive components are required to make such a foam, and the additional processing required to apply the barrier or film coating adds cost as well.

Another advantage of an anti-fogging foam which is not barrier or film coated would be in the enhanced conformability of the foam. Conformability is desired because, to effectively seal the interior to exterior passageways of the automobile, the foams must be adapted to fit the sometimes tight radii and intricate contours of these passageways. Barrier or film coated foam is less conformable than anti-fogging foams which do not require barrier or film coating. A more conformable foam will provide a better seal, for a longer period of time, than a less conformable foam.

It should be noted that the "fogging" problem is not unique to the automotive industry. Anti-fogging foam gaskets have applications in other areas where dirt and condensate residue would have a deleterious effect. Such applications would include, for example, electronics or semiconductor manufacturing facilities, electronics packaging, clean rooms, and medical device applications.

SUMMARY OF THE INVENTION

The present invention comprises a cellular foam composition, and method for making the same. In one embodiment, the foam comprises a mixture of glutarate ester plasticizer, adipate ester plasticizer, alcohol carboxylic acid ester, cell stabilizer, barium/zinc activator stabilizer, potassium/zinc activator stabilizer, azodicarbonamide blowing agent, low-fogging vinyl dispersion resin, vinyl blending resin, and black acrylic pigment dispersion. In another embodiment, the foam comprises a mixture of glutarate ester plasticizer, adipate ester plasticizer, alcohol carboxylic acid ester, cell stabilizer, barium/zinc activator stabilizer, zinc stabilizer, azodicarbonamide blowing agent, low-fogging vinyl dispersion resin, vinyl blending resin, and black acrylic pigment dispersion.

The foam is made by the process of mixing the ingredients until a homogenous liquid mixture is present, de-airing the homogeneous liquid mixture, casting the liquid mixture on a non-fogging release-coated surface, expanding the cast liquid mixture by exposing it to an elevated temperature for a prescribed duration of time, and then either cooling the expanded mixture and winding it into rolls, or coating the stabilized composition with pressure sensitive adhesive, cooling it, and then winding it into rolls. The resulting low volatility foam is reasonable in cost of its components and in cost of manufacture, and exhibits anti-fogging characteristics desired in a variety of applications. These results are accomplished without requiring barrier or film coating of the foam.

DESCRIPTION OF THE INVENTION

The present invention comprises a foam composition which exhibits anti-fogging characteristics without the use of a barrier or film coating. The properties of the foam composition make it suitable for use in the automotive industry and in other applications as may be found, for example, in the electronics industry, where low volatility foams are desired.

In one embodiment, the foam composition of the present invention is made from the following component chemicals: glutarate ester plasticizer (polymeric) such as that sold by C. P. Hall under the trade name P550; adipate ester plasticizer (polymeric) such as that sold by C. P. Hall under the trade name RX13290; alcohol carboxylic acid ester such as that sold by BYK-Chemie under the trade name BYK-1142; cell stabilizer such as that sold by Air Products and Chemicals under the trade name VS103; barium/zinc activator stabilizer such as that sold by OMG Americas under the trade name B343, or that sold by Baerlocher USA under the trade name B-650; potassium/zinc activator stabilizer such as that sold by Ferro Chemical under the trade name THERM CHEK 5573 SF, or that sold by Witco Chemical under the trade name MARK 1501; azodicarbonamide blowing agent such as that sold by Otsuka Chemical Company under the trade name ACTAFOAM VI-25; low-fogging vinyl dispersion resin such as that sold by Solvay Chemical under the trade name SIAMVIC 367 NK, or that sold by Solvay Chemical under the trade name SOLVIN 367 NK, or that sold by Solvay Chemical under the trade name SOLVIC 367 NK; vinyl blending resin such as that sold by Occidental Chemical under the trade name OXY-567; and black acrylic pigment dispersion such as that sold by Elementis Specialities under the trade name ST-8307.

The formula for this embodiment of the foam composition involves combining the foregoing chemical components in the following proportions:

| COMPONENT | PARTS BY WEIGHT |
| --- | --- |
| Glutarate Ester Plasticizer (Polymeric) | 70.0–105.0 |
| Adipate Ester Plasticizer (Polymeric) | 5.0–40.0 |
| Alcohol Carboxylic Acid Ester | 1.0–5.0 |
| Cell Stabilizer | 1.5–3.0 |
| Barium/Zinc Activator Stabilizer | 3.0–8.0 |
| Potassium/Zinc Activator Stabilizer | 1.0–3.0 |
| Azodicarbonamide Blowing Agent | 2.0–15.0 |
| Low-fogging Vinyl Dispersion Resin | 50.0–75.0 |
| Vinyl Blending Resin | 25.0–50.0 |
| Black Acrylic Pigment Dispersion | 2.0–8.0 |

The exact proportional formula used in a particular implementation of this embodiment of the present invention is left to the discretion of the practitioner. It will be appreciated by those skilled in the art that, by adjusting the proportion of one or more of the chemical components within the foregoing ranges in a particular implementation of this embodiment, certain desirable characteristics of the foam composition can be enhanced, and certain undesirable characteristics of the foam composition can be diminished.

One implementation of this embodiment of the present invention involves combining the chemical components in the following proportions:

| COMPONENT | PARTS BY WEIGHT |
| --- | --- |
| Glutarate Ester Plasticizer (Polymeric) | 100.0 |
| Adipate Ester Plasticizer (Polymeric) | 10.0 |
| Alcohol Carboxylic Acid Ester | 1.5 |
| Cell Stabilizer | 2.0 |
| Barium/Zinc Activator Stabilizer | 7.0 |
| Potassium/Zinc Activator Stabilizer | 1.0 |
| Azodicarbonamide Blowing Agent | 10.0 |
| Low-fogging Vinyl Dispersion Resin | 75.0 |
| Vinyl Blending Resin | 25.0 |
| Black Acrylic Pigment Dispersion | 8.0 |

According to a second embodiment, the foam composition of the present invention is made from the following component chemicals: glutarate ester plasticizer (polymeric) such as that sold by C. P. Hall under the trade name P550; adipate ester plasticizer (polymeric) such as that sold by C. P. Hall under the trade name RX13290; alcohol carboxylic acid ester such as that sold by BYK-Chemie under the trade name BYK-1142; cell stabilizer such as that sold by Air Products and Chemicals under the trade name VS103; barium/zinc activator stabilizer such as that sold by OMG Americas under the trade name B343, or that sold by Baerlocher USA under the trade name B-650; zinc stabilizer such as that sold by Baerlocher USA under the trade name L-230; azodicarbonamide blowing agent such as that sold by Otsuka Chemical Company under the trade name ACT-AFOAM VI-25; low-fogging vinyl dispersion resin such as that sold by Solvay Chemical under the trade name SIAM-VIC 367 NK, or that sold by Solvay Chemical under the trade name SOLVIN 367 NK, or that sold by Solvay Chemical under the trade name SOLVIC 367 NK; vinyl blending resin such as that sold by Occidental Chemical under the trade name OXY-567; and black acrylic pigment dispersion such as that sold by Elementis Specialities under the trade name ST-8307.

The formula for this embodiment of the foam composition involves combining the foregoing chemical components in the following proportions:

| COMPONENT | PARTS BY WEIGHT |
| --- | --- |
| Glutarate Ester Plasticizer (Polymeric) | 70.0–105.0 |
| Adipate Ester Plasticizer (Polymeric) | 5.0–40.0 |
| Alcohol Carboxylic Acid Ester | 1.0–5.0 |
| Cell Stabilizer | 1.5–3.0 |
| Barium/Zinc Activator Stabilizer | 3.0–8.0 |
| Zinc Stabilizer | 0.5–2.0 |
| Azodicarbonamide Blowing Agent | 2.0–15.0 |
| Low-fogging Vinyl Dispersion Resin | 50.0–75.0 |
| Vinyl Blending Resin | 25.0–50.0 |
| Black Acrylic Pigment Dispersion | 2.0–8.0 |

The exact proportional formula used in a particular implementation of this embodiment of the present invention is left to the discretion of the practitioner. It will be appreciated by those skilled in the art that, by adjusting the proportion of one or more of the chemical components within the foregoing ranges in a particular implementation of this embodiment, certain desirable characteristics of the foam composition can be enhanced, and certain undesirable characteristics of the foam composition can be diminished.

One implementation of this embodiment of the present invention involves combining the chemical components in the following proportions:

| COMPONENT | PARTS BY WEIGHT |
| --- | --- |
| Glutarate Ester Plasticizer (Polymeric) | 100.0 |
| Adipate Ester Plasticizer (Polymeric) | 10.0 |
| Alcohol Carboxylic Acid Ester | 1.5 |
| Cell Stabilizer | 2.0 |
| Barium/Zinc Activator Stabilizer | 7.0 |
| Zinc Stabilizer | 0.76 |
| Azodicarbonamide Blowing Agent | 10.0 |
| Low-fogging Vinyl Dispersion Resin | 75.0 |
| Vinyl Blending Resin | 25.0 |
| Black Acrylic Pigment Dispersion | 8.0 |

The following process is used to prepare the foam composition according to the present invention:

1. Mix the chemical components until homogenous in a container of adequate size. The container must be constructed of a material, such as stainless steel or carbon steel, known in the art to be non-reactive with the chemical components used in the present invention.

2. De-air the homogeneous mixture using methods known in the art for removing the air from a liquid mixture of this nature.

3. Using methods known in the art, cast the homogeneous mixture on a surface at a thickness proportional to the desired final expanded thickness and density. The surface must be a non-fogging release-coated surface such as stainless steel, paper such as that sold by Plainwell Paper under the trade name ST PAPER, polyester film, or other material known in the art not to adhere to the homogeneous mixture and not to degrade the anti-fogging characteristics of the foam.

4. Expand the cast liquid mixture into a cellular foam by exposing it to temperatures of about 350–400° F. for about 2 to 10 minutes.

5. If the foam is to include an adhesive, coat the stabilized foam with pressure sensitive adhesive.

6. Cool the foam.

7. Wind the cooled foam into rolls.

After the foam has been wound into rolls, it may be slit into appropriate widths or otherwise cut into desired shapes by methods known in the art.

It will be appreciated by those of skill in the art that the foam of the present invention exhibits anti-fogging characteristics which are desired in a myriad of applications, including but not limited to those in the automotive industry, electronics and semiconductor manufacturing facilities, electronics packaging, clean rooms, and medical device applications. The foam is made with readily available components and is made by a method containing very few steps and requiring very few constraints. Therefore, the anti-fogging foam is reasonable in cost of its components and in manufacture.

Those skilled in the art also will appreciate that the foam of the present invention possesses a conformability which exceeds that possessed by foams which are barrier or film coated. In automotive and other applications, the foam of the present invention will provide a better seal, for a longer period of time, than a less conformable, barrier or film coated foam.

While this invention has been described as having a preferred design, the present invention can be further modified within the scope and spirit of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

I claim:

1. A composition comprising a mixture of:
    glutarate ester plasticizer;
    adipate ester plasticizer;
    alcohol carboxylic acid ester;
    cell stabilizer;
    barium/zinc activator stabilizer;
    potassium/zinc activator stabilizer;
    azodicarbonamide blowing agent;
    low-fogging vinyl dispersion resin;
    vinyl blending resin; and
    black acrylic pigment dispersion.

2. The composition of claim 1, wherein:
    the glutarate ester plasticizer initially is present in about 70.0 to about 105.0 parts by weight;
    the adipate ester plasticizer initially is present in about 5.0 to about 40.0 parts by weight;
    the alcohol carboxylic acid ester initially is present in about 1.0 to about 5.0 parts by weight;
    the cell stabilizer initially is present in about 1.5 to about 3.0 parts by weight;
    the barium/zinc activator stabilizer initially is present in about 3.0 to about 8.0 parts by weight;
    the potassium/zinc activator stabilizer initially is present in about 1.0 to about 3.0 parts by weight;
    the azodicarbonamide blowing agent initially is present in about 2.0 to about 15.0 parts by weight;
    the low-fogging vinyl dispersion resin initially is present in about 50.0 to about 75.0 parts by weight;
    the vinyl blending resin initially is present in about 25.0 to about 50.0 parts by weight; and
    the black acrylic pigment dispersion initially is present in about 2.0 to about 8.0 parts by weight.

3. The composition of claim 1, wherein the mixture is
    mixed until homogeneous;
    de-aired;
    cast as a liquid material on a non-fogging release-coated surface;
    exposed to an elevated temperature for a prescribed duration of time; and
    cooled.

4. A low volatility cellular foam, comprising the composition of claim 1.

5. A method for making a cellular foam comprising the steps of:
    adding at least about 70.0 parts by weight glutarate ester plasticizer, at least about 5.0 parts by weight adipate ester plasticizer, at least about 1.0 parts by weight alcohol carboxylic acid ester, at least about 1.5 parts by weight cell stabilizer, at least about 3.0 parts by weight barium/zinc activator stabilizer, at least about 1.0 parts by weight potassium/zinc activator stabilizer, at least about 2.0 parts by weight azodicarbonamide blowing agent, at least about 50.0 parts by weight low-fogging vinyl dispersion resin, at least about 25.0 parts by weight vinyl blending resin, and at least about 2.0 parts by weight black acrylic pigment dispersion;
    mixing the ingredients until a homogenous liquid mixture is present;
    de-airing the homogeneous liquid mixture;
    casting the liquid mixture on a non-fogging release-coated surface;
    expanding the cast liquid mixture by exposing it to an elevated temperature for a prescribed duration of time; and
    cooling the expanded mixture.

6. The method of claim 5, wherein the elevated temperature is within the range of about 350° F. to about 400° F.

7. The method of claim 5, wherein the prescribed duration of time is within the range of about 2 minutes to about 10 minutes.

8. The method of claim 5, wherein:
    the glutarate ester plasticizer initially is added in about 70.0 to about 105.0 parts by weight;
    the adipate ester plasticizer initially is added in about 5.0 to about 40.0 parts by weight;
    the alcohol carboxylic acid ester initially is added in about 1.0 to about 5.0 parts by weight;
    the cell stabilizer initially is added in about 1.5 to about 3.0 parts by weight;
    the barium/zinc activator stabilizer initially is added in about 3.0 to about 8.0 parts by weight;
    the potassium/zinc activator stabilizer initially is added in about 1.0 to about 3.0 parts by weight;
    the azodicarbonamide blowing agent initially is added in about 2.0 to about 15.0 parts by weight;
    the low-fogging vinyl dispersion resin initially is added in about 50.0 to about 75.0 parts by weight;
    the vinyl blending resin initially is added in about 25.0 to about 50.0 parts by weight; and
    the black acrylic pigment dispersion initially is added in about 2.0 to about 8.0 parts by weight.

9. The method of claim 5, further comprising prior to the step of the step of cooling the expanded mixture, the step of coating the expanded mixture with a pressure sensitive adhesive.

10. The method of claim 5, further comprising the step of:
winding the cooled expanded mixture into rolls.

11. A composition comprising a mixture of:
glutarate ester plasticizer;
adipate ester plasticizer;
alcohol carboxylic acid ester;
cell stabilizer;
barium/zinc activator stabilizer;
zinc stabilizer;
azodicarbonamide blowing agent;
low-fogging vinyl dispersion resin;
vinyl blending resin; and
black acrylic pigment dispersion.

12. The composition of claim 11, wherein:
the glutarate ester plasticizer initially is present in about 70.0 to about 105.0 parts by weight;
the adipate ester plasticizer initially is present in about 5.0 to about 40.0 parts by weight;
the alcohol carboxylic acid ester initially is present in about 1.0 to about 5.0 parts by weight;
the cell stabilizer initially is present in about 1.5 to about 3.0 parts by weight;
the barium/zinc activator stabilizer initially is present in about 3.0 to about 8.0 parts by weight;
the zinc stabilizer initially is present in about 0.5 to about 2.0 parts by weight;
the azodicarbonamide blowing agent initially is present in about 2.0 to about 15.0 parts by weight;
the low-fogging vinyl dispersion resin initially is present in about 50.0 to about 75.0 parts by weight;
the vinyl blending resin initially is present in about 25.0 to about 50.0 parts by weight; and
the black acrylic pigment dispersion initially is present in about 2.0 to about 8.0 parts by weight.

13. The composition of claim 11, wherein the mixture is
mixed until homogeneous;
de-aired;
cast as a liquid material on a non-fogging release-coated surface;
exposed to an elevated temperature for a prescribed duration of time; and
cooled.

14. A low volatility cellular foam, comprising the composition of claim 11.

15. A method for making a cellular foam comprising the steps of:
adding at least about 70.0 parts by weight glutarate ester plasticizer, at least about 5.0 parts by weight adipate ester plasticizer, at least about 1.0 parts by weight alcohol carboxylic acid ester, at least about 1.5 parts by weight cell stabilizer, at least about 3.0 parts by weight barium/zinc activator stabilizer, at least about 0.5 parts by weight zinc stabilizer, at least about 2.0 parts by weight azodicarbonamide blowing agent, at least about 50.0 parts by weight low-fogging vinyl dispersion resin, at least about 25.0 parts by weight vinyl blending resin, and at least about 2.0 parts by weight black acrylic pigment dispersion;
mixing the ingredients until a homogenous liquid mixture is present;
de-airing the homogeneous liquid mixture;
casting the liquid mixture on a non-fogging release-coated surface;
expanding the cast liquid mixture by exposing it to an elevated temperature for a prescribed duration of time; and
cooling the expanded mixture.

16. The method of claim 15, wherein the elevated temperature is within the range of about 350° F. to about 400° F.

17. The method of claim 15, wherein the prescribed duration of time is within the range of about 2 minutes to about 10 minutes.

18. The method of claim 15, wherein:
the glutarate ester plasticizer initially is added in about 70.0 to about 105.0 parts by weight;
the adipate ester plasticizer initially is added in about 5.0 to about 40.0 parts by weight;
the alcohol carboxylic acid ester initially is added in about 1.0 to about 5.0 parts by weight;
the cell stabilizer initially is added in about 1.5 to about 3.0 parts by weight;
the barium/zinc activator stabilizer initially is added in about 3.0 to about 8.0 parts by weight;
the zinc stabilizer initially is added in about 0.5 to about 2.0 parts by weight;
the azodicarbonamide blowing agent initially is added in about 2.0 to about 15.0 parts by weight;
the low-fogging vinyl dispersion resin initially is added in about 50.0 to about 75.0 parts by weight;
the vinyl blending resin initially is added in about 25.0 to about 50.0 parts by weight; and
the black acrylic pigment dispersion initially is added in about 2.0 to about 8.0 parts by weight.

19. The method of claim 15, further comprising prior to the step of the step of cooling the expanded mixture, the step of coating the expanded mixture with a pressure sensitive adhesive.

20. The method of claim 15, further comprising the step of:
winding the cooled expanded mixture into rolls.

* * * * *